United States Patent
Yamasaki et al.

(10) Patent No.: US 9,524,812 B2
(45) Date of Patent: Dec. 20, 2016

(54) HEAT-RECOVERABLE ARTICLE, WIRE SPLICE, AND WIRE HARNESS

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Satoshi Yamasaki, Osaka (JP); Yasutaka Emoto, Sennan-gun (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 0 days.

(21) Appl. No.: 14/772,539

(22) PCT Filed: Oct. 7, 2014

(86) PCT No.: PCT/JP2014/076757
§ 371 (c)(1),
(2) Date: Sep. 3, 2015

(87) PCT Pub. No.: WO2015/068511
PCT Pub. Date: May 14, 2015

(65) Prior Publication Data
US 2016/0019999 A1    Jan. 21, 2016

(30) Foreign Application Priority Data

Nov. 6, 2013    (JP) .................................. 2013-230487

(51) Int. Cl.
*H01B 7/00* (2006.01)
*B32B 1/08* (2006.01)
(Continued)

(52) U.S. Cl.
CPC ......... *H01B 7/0045* (2013.01); *B29C 61/0616* (2013.01); *B32B 1/08* (2013.01);
(Continued)

(58) Field of Classification Search
CPC ........... H01B 7/0045; H02G 1/14; B32B 1/08; B32B 27/32; B32B 27/306; B32B 27/34; B32B 2307/3065; B32B 2307/736; B32B 2597/00; B32B 27/08
(Continued)

(56) References Cited

U.S. PATENT DOCUMENTS 4,908,166 A * 3/1990 Salyer ..................... C08L 23/06
                                                      252/70
6,391,974 B1 * 5/2002 Ogawa ................. C08F 210/00
                                                      525/191
(Continued)

FOREIGN PATENT DOCUMENTS

DE    31 07 907 A1    9/1982
JP    H06-313071 A    11/1994
(Continued)

*Primary Examiner* — Timothy Thompson
*Assistant Examiner* — Charles Pizzuto
(74) *Attorney, Agent, or Firm* — Drinker Biddle & Reath LLP

(57) ABSTRACT

An object of the present invention is to provide a heat-recoverable article that thermally shrinks in a suitable temperature range and that does not easily split, and a wire splice and a wire harness that use the heat-recoverable article. The heat-recoverable article according to the present invention is a cylindrical, heat-recoverable article including a base layer. The base layer contains two or more polyolefin-based resins and a flame retardant, the base layer has a single melting-point peak temperature, the melting-point peak temperature is 112° C. or more and 128° C. or less, and a heat of fusion of the base layer is 60 J/g or more and 85 J/g or (Continued)

less. A heat of fusion of a total resin component of the base layer is preferably 80 J/g or more and 135 J/g or less.

8 Claims, 3 Drawing Sheets

(51) Int. Cl.
| | |
|---|---|
| B32B 27/34 | (2006.01) |
| B32B 27/32 | (2006.01) |
| B32B 27/30 | (2006.01) |
| H02G 1/14 | (2006.01) |
| B32B 27/08 | (2006.01) |
| C08J 5/00 | (2006.01) |
| C08L 23/02 | (2006.01) |
| C08L 23/08 | (2006.01) |
| C08L 23/16 | (2006.01) |
| H01B 3/28 | (2006.01) |
| H01B 3/30 | (2006.01) |
| H01B 3/44 | (2006.01) |
| H02G 15/18 | (2006.01) |
| B29C 61/06 | (2006.01) |
| B32B 7/12 | (2006.01) |
| H01B 7/295 | (2006.01) |

(52) U.S. Cl.
CPC ............... *B32B 7/12* (2013.01); *B32B 27/08* (2013.01); *B32B 27/306* (2013.01); *B32B 27/32* (2013.01); *B32B 27/34* (2013.01); *C08J 5/00* (2013.01); *C08L 23/02* (2013.01); *C08L 23/08* (2013.01); *C08L 23/16* (2013.01); *H01B 3/28* (2013.01); *H01B 3/30* (2013.01); *H01B 3/44* (2013.01); *H01B 3/441* (2013.01); *H01B 7/295* (2013.01); *H02G 1/14* (2013.01); *H02G 15/1806* (2013.01); *B32B 2307/3065* (2013.01); *B32B 2307/5825* (2013.01); *B32B 2307/736* (2013.01); *B32B 2553/00* (2013.01); *B32B 2597/00* (2013.01)

(58) Field of Classification Search
USPC .......................... 174/72 A; 428/36.9, 36.91
See application file for complete search history.

(56) References Cited

U.S. PATENT DOCUMENTS

| | | | |
|---|---|---|---|
| 2008/0073105 A1* | 3/2008 | Clark | .................. H01B 7/0216 174/112 |
| 2014/0225051 A1* | 8/2014 | Naskar | .................... D01F 11/06 252/601 |

FOREIGN PATENT DOCUMENTS

| | | |
|---|---|---|
| JP | 2000-119403 A | 4/2000 |
| JP | 2000-129042 A | 5/2000 |
| JP | 2002-012731 A | 1/2002 |
| JP | 2002-292737 A | 10/2002 |
| JP | 2002-348417 A | 12/2002 |
| JP | 2003-026818 A | 1/2003 |
| JP | 2007-062825 A | 3/2007 |
| JP | 2010-185056 A | 8/2010 |
| JP | 2014-069522 A | 4/2014 |
| WO | WO-2014/097694 A1 | 6/2014 |

\* cited by examiner

HEAT-RECOVERABLE ARTICLE, WIRE SPLICE, AND WIRE HARNESS

TECHNICAL FIELD

The present invention relates to a heat-recoverable article, a wire splice, and a wire harness.

BACKGROUND ART

Heat-recoverable articles such as a heat-shrinkable tubing are used for, for example, protection, insulation, waterproofing, and corrosion prevention of a connected portion of insulated electric wires, a wiring terminal, a metal tube, or the like and for packaging of commercial products. For example, when a connected portion of insulated electric wires is covered with a heat-shrinkable tubing and heated, the heat-shrinkable tubing shrinks so as to conform to the shape of the connected portion and comes in close contact with the connected portion. Thus, the heat-shrinkable tubing can protect the connected portion. For such heat-recoverable articles, for example, it is desirable that the heat-recoverable articles do not thermally shrink at an ambient temperature before heating, and that, during thermal shrinkage, an excessively high thermal shrinkage temperature will have no adverse effect on an article to be protected.

For example, for a cylindrical, heat-recoverable article, it is desirable that the heat-recoverable article does not split in the axial direction due to stress in a circumferential direction during shrinkage. To meet this desire, a heat-recoverable article having perforations in an axial direction thereof has been proposed in which stress in a circumferential direction is released as a result of the perforations opening during thermal shrinkage, thereby preventing the heat-recoverable article from splitting (refer to Japanese Unexamined Patent Application Publication No. 2007-62825).

CITATION LIST

Patent Literature

PTL 1: Japanese Unexamined Patent Application Publication No. 2007-62825

SUMMARY OF INVENTION

Technical Problem

However, the heat-recoverable article described in the publication is disadvantageous in that, since the perforations open while covering, the covered article cannot be sufficiently protected against the outside.

The present invention has been made in view of the circumstances described above, and an object of the present invention is to provide a heat-recoverable article that thermally shrinks in a suitable temperature range and that does not easily split, and a wire splice and a wire harness that use the heat-recoverable article.

Solution to Problem

An invention made in order to solve the above problem provides a cylindrical, heat-recoverable article including a base layer, in which the base layer contains a flame retardant and two or more polyolefin-based resins, the base layer has a single melting-point peak temperature, the melting-point peak temperature is 112° C. or more and 128° C. or less, and a heat of fusion of the base layer is 60 J/g or more and 85 J/g or less.

Another invention made in order to solve the above problem provides a wire splice including a plurality of wires each of which includes a conductor and an insulating layer formed on the outside of the conductor, and a tube adhering to a portion where the conductors of the wires are connected to each other, the tube being formed by thermally shrinking the heat-recoverable article.

Still another invention made in order to solve the above problem provides a wire harness including a plurality of wires each of which includes a conductor and an insulating layer formed on the outside of the conductor, and a tube adhering to the wires and formed by thermally shrinking the heat-recoverable article.

Advantageous Effects of Invention

The heat-recoverable article of the present invention thermally shrinks in a suitable temperature range and does not easily split. As a result, the lifetime of a heat-recoverable article, a wire splice, and a wire harness can be extended.

DESCRIPTION OF EMBODIMENTS

Figure 1:
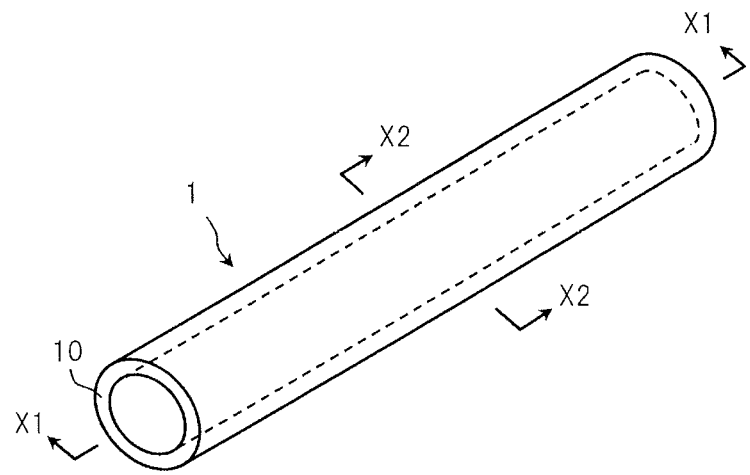
FIG. 1 is a schematic perspective view showing a heat-recoverable article according to a first embodiment of the present invention.

[Description of Embodiments of the Present Invention]

In examining the problem described above, the inventors of the present invention found that, in a heat-recoverable article that includes a base layer containing a flame retardant, when the base layer has a single melting-point peak temperature and a heat of fusion of the base layer is in a particular range, the heat-recoverable article does not easily split, and when the melting-point peak temperature is in a particular range, the heat-recoverable article thermally shrinks in a suitable temperature range.

Specifically, the present invention provides a cylindrical, heat-recoverable article including a base layer, in which the base layer contains a flame retardant and two or more polyolefin-based resins, the base layer has a single melting-point peak temperature, the melting-point peak temperature is 112° C. or more and 128° C. or less, and a heat of fusion of the base layer is 60 J/g or more and 85 J/g or less.

According to the heat-recoverable article, the base layer has a single melting-point peak temperature. Thermal shrinkage of a heat-recoverable article occurs around the melting-point peak temperature of a base layer. Accordingly, since the number of melting-point peak temperatures is one, during heating, the heat-recoverable article thermally shrinks not stepwise but in one step. If a heat-recoverable article thermally shrinks stepwise, uniform thermal shrinkage does not easily occur. Therefore, stress concentration easily occurs in the heat-recoverable article, and the heat-recoverable article easily splits. However, the heat-recoverable article described above thermally shrinks in one step. Accordingly, the thermal shrinkage occurs uniformly, and the heat-recoverable article does not easily split. Furthermore, since the thermal shrinkage occurs in one step, the heat-recoverable article after thermal shrinkage has a homogeneous appearance.

When the melting-point peak temperature of the base layer is less than the lower limit, the heat-recoverable article thermally shrinks at a low temperature and thus it may be difficult to handle the heat-recoverable article. When the melting-point peak temperature exceeds the upper limit, the temperature at which the heat-recoverable article thermally shrinks increases. Consequently, an article covered with the heat-recoverable article may be adversely affected. However, the heat-recoverable article thermally shrinks in a suitable temperature range because the melting-point peak temperature of the base layer is in the above range. Accordingly, the heat-recoverable article can be suitably used as a covering material. The term "melting-point peak temperature of a base layer" refers to a temperature at which an amount of heat absorption in a base layer per time becomes maximum (peak) when the temperature of the base layer that has been heated at 180° C. for two minutes is increased from room temperature to 200° C. at 10° C./min with a differential scanning calorimeter.

When the amount of flame retardant, an inorganic filler, or the like contained in the base layer is large, the heat of fusion of the base layer decreases. Accordingly, when the heat of fusion of the base layer is less than the lower limit, the amount of flame retardant, an inorganic filler, or the like contained in the base layer may be excessively large. As a result, a decrease in elongation, an increase in the ease of splitting, and the like may occur. On the other hand, when the heat of fusion of the base layer exceeds the upper limit, flame retardancy, toughness, or elongation necessary for a heat-recoverable article may degrade. The term "heat of fusion of a base layer" refers to a value (J/g) determined by dividing an amount (J) of heat absorption of a base layer by a mass (g) of the base layer, the amount (J) of heat being absorbed during the temperature increase from room temperature to 200° C. when the melting-point peak temperature is measured.

Preferably, of the polyolefin-based resins, at least one of the polyolefin-based resins has a melting-point peak temperature of 112° C. or more, and at least another one of the polyolefin-based resins has a melting-point peak temperature of less than 112° C. or does not have a melting-point peak temperature. By controlling features of the polyolefin-based resins in this manner, the melting-point peak temperature of the base layer and a heat of fusion of a total resin component of the base layer can be adjusted in the above ranges easily and reliably.

The another one of the polyolefin-based resins is preferably an ethylene-propylene copolymer elastomer, an ethylene-propylene rubber, or a polyethylene-based elastomer obtained by copolymerizing ethylene with at least any of butene, hexene, and octene. In this case, the melting-point peak temperature of the base layer and the heat of fusion of the total resin component of the base layer can be adjusted in the above ranges more easily and more reliably.

The heat of fusion of the total resin component of the base layer is preferably 80 J/g or more and 135 J/g or less. When the heat of fusion is less than the lower limit, the heat-recoverable article may easily split at a high temperature. In addition, since the heat-recoverable article gradually thermally shrinks from a low temperature during heating, the heat-recoverable article after thermal shrinkage may have a non-homogeneous appearance. On the other hand, when the heat of fusion exceeds the upper limit, the temperature at which the heat-recoverable article thermally shrinks increases. Consequently, an article covered with the heat-recoverable article may be adversely affected. In addition, the heat-recoverable article may easily split during thermal shrinkage. The term "heat of fusion of a total resin component of a base layer" refers to a value (J/g) determined by dividing an amount (J) of heat absorption of a base layer by a total mass (g) of resin components in the base layer, the amount (J) of heat being absorbed during the temperature increase from room temperature to 200° C. when the melting-point peak temperature is measured, on the assumption that all absorption of heat of the base layer is caused by polyolefin-based resins and other resin components contained in the base layer.

The heat-recoverable article preferably includes an adhesive layer formed on an inner circumferential surface of the base layer. By providing the adhesive layer, adhesiveness between the base layer and a cover portion to be covered with the heat-recoverable article is enhanced to improve an insulation property, a waterproof property, an anticorrosion property, etc.

The adhesive layer preferably contains an ethylene-vinyl acetate copolymer or a polyamide. In this case, adhesiveness between the base layer and a cover portion to be covered with the heat-recoverable article is enhanced more reliably to improve an insulation property, a waterproof property, an anticorrosion property, etc.

The present invention provides a wire splice including a plurality of wires each of which includes a conductor and an insulating layer formed on the outside of the conductor, and a tube adhering to a portion where the conductors of the wires are connected to each other, the tube being formed by thermally shrinking the heat-recoverable article.

The wire splice includes the tube formed by thermally shrinking the heat-recoverable article that does not easily split as described above. Therefore, the lifetime of the wire splice can be extended, and a protective state such as protection, insulation, waterproofing, and corrosion prevention of the wires and the connected portion of the wires can be maintained for a long period of time.

The present invention further provides a wire harness including a plurality of wires each of which includes a conductor and an insulating layer formed on the outside of the conductor, and a tube adhering to the wires and formed by thermally shrinking the heat-recoverable article.

The wire harness includes the tube formed by thermally shrinking the heat-recoverable article that does not easily split as described above. Therefore, the lifetime of the wire harness can be extended, and a protective state such as protection, insulation, waterproofing, and corrosion prevention of the wires can be maintained for a long period of time.

[Details of Embodiments of the Present Invention]

Heat-recoverable articles, a wire splice, and a wire harness according to the present invention will now be described with reference to the drawings. The present invention is not limited to these illustrative examples but is defined by the claims described below. It is intended that the scope of the present invention includes equivalents of the claims and all modifications within the scope of the claims.

[Heat-Recoverable Article]

First, embodiments of a heat-recoverable article will be described below.

[First Embodiment]

Figure 2:
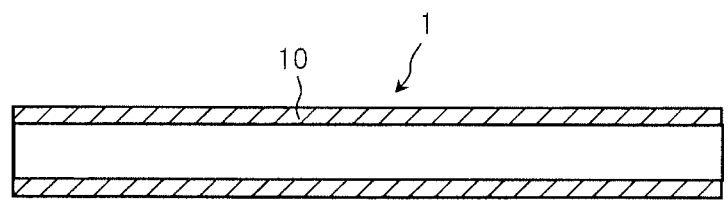
FIG. 2 is a schematic cross-sectional view taken along line X1-X1 in FIG. 1.
Figure 3:
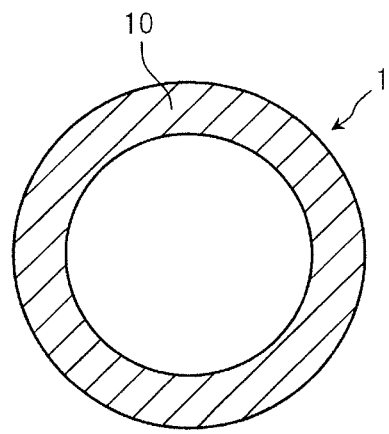
FIG. 3 is a schematic cross-sectional view taken along line X2-X2 in FIG. 1.

A cylindrical, heat-recoverable article 1 of a first embodiment shown in FIGS. 1 to 3 is used as a covering for, for example, protection, insulation, waterproofing, and corrosion prevention of a connected portion of insulated electric wires, a wiring terminal, a metal tube, or the like. The heat-recoverable article 1 includes a base layer 10.

<Base Layer>

The base layer 10 contains two or more polyolefin-based resins as a main component. The term "main component" refers to a component having a highest content, and, for example, a component having a content of 50% by mass or more.

The base layer 10 is formed as a tube whose diameter is reduced by heating. The base layer 10 contains a flame retardant. Furthermore, other additives may be added to the base layer 10, as required. Examples of the additives include an antioxidant, a copper inhibitor, a lubricant, a colorant, a heat stabilizer, and an ultraviolet absorber.

<Melting-Point Peak Temperature of Base Layer>

The base layer 10 has a single melting-point peak temperature. Thermal shrinkage of the heat-recoverable article 1 occurs around the melting-point peak temperature of the base layer 10. Accordingly, since the number of melting-point peak temperatures is one, during heating, the heat-recoverable article 1 thermally shrinks not stepwise but in one step.

The lower limit of the melting-point peak temperature of the base layer 10 is 112° C., and preferably 115° C. The upper limit of the melting-point peak temperature of the base layer 10 is 128° C., and more preferably 123° C. When the melting-point peak temperature is less than the lower limit, the heat-recoverable article 1 thermally shrinks at a low temperature and thus it may be difficult to handle the heat-recoverable article 1. When the melting-point peak temperature exceeds the upper limit, the temperature at which the heat-recoverable article 1 thermally shrinks increases. Consequently, an article covered with the heat-recoverable article may be adversely affected.

(Polyolefin-Based Resin)

Examples of the polyolefin-based resins include polyethylene, polypropylene, ethylene-α-olefin copolymers, ethylene-vinyl ester copolymers, ethylene-α,β-unsaturated carboxylic acid alkyl ester copolymers, olefin-based thermoplastic elastomers, and olefin-based rubbers.

The lower limit of a melt flow rate (MFR) of each of the polyolefin-based resins is preferably 0.1 g/10 min, and more preferably 0.4 g/10 min. When the MFR is less than the lower limit, a high pressure is necessary for forming the base layer 10 by extrusion molding. The upper limit of the MFR of each of the polyolefin-based resins is 10 g/10 min, and more preferably 4 g/10 min. When the MFR exceeds the upper limit, the resin excessively flows and it becomes difficult to make the shape of the base layer uniform. The "MFR" means a value measured in accordance with JIS-K7210:1997 at a temperature of 190° C. and at a load of 21.6 kg by using an extrusion plastometer specified in JIS-K6760: 1997.

Examples of polyethylene include low-density polyethylene produced by a high-pressure radical polymerization method, very low-density polyethylene, linear low-density polyethylene, high-density polyethylene, and metallocene polymerized polyethylene.

Examples of polypropylene include homopolypropylene, block-polypropylene, and random polypropylene.

Examples of the α-olefin of the ethylene-α-olefin copolymers include α-olefins having about 3 to 20 carbon atoms. More specifically, examples of the α-olefin include propylene, 1-butene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene.

Examples of the vinyl ester of the ethylene-vinyl ester copolymers include vinyl propionate, vinyl acetate, vinyl caproate, vinyl caprylate, vinyl laurate, vinyl stearate, and vinyl trifluoroacetate.

Examples of the α,β-unsaturated carboxylic acid alkyl ester of the ethylene-α,β-unsaturated carboxylic acid alkyl ester copolymers include methyl acrylate, methyl methacrylate, ethyl acrylate, and ethyl methacrylate.

Examples of the olefin-based thermoplastic elastomers include low-density polyethylene elastomers, very low-density polyethylene elastomers, and polypropylene elastomers.

Examples of the olefin-based rubbers include ethylene-propylene-based rubbers, butadiene-based rubbers, and isoprene-based rubbers.

Examples of the ethylene-propylene-based rubbers include random copolymers containing ethylene and propylene as main components, and random copolymers containing, as main components, ethylene and propylene that contain a diene monomer such as dicyclopentadiene or ethylidene norbornene as a third component.

Examples of the butadiene-based rubbers include styrene-butadiene block copolymers, styrene-ethylene-butadiene-styrene copolymers which are hydrogenated or partially hydrogenated derivatives of the styrene-butadiene block copolymers, 1,2-polybutadiene, maleic anhydride-modified styrene-ethylene-butadiene-styrene copolymers, and modified butadiene rubbers having a core-shell structure.

Examples of the isoprene-based rubbers include styrene-isoprene block copolymers, styrene-ethylene-isoprene-styrene copolymers which are hydrogenated or partially hydrogenated derivatives of the styrene-isoprene block copolymers, maleic anhydride-modified styrene-ethylene-isoprene-styrene copolymers, and modified isoprene rubbers having a core-shell structure.

The lower limit of the heat of fusion of the base layer 10 is 60 J/g, and preferably 65 J/g.

The upper limit of the heat of fusion of the base layer 10 is 85 J/g, and preferably 80 J/g. When the amount of flame retardant, an inorganic filler, or the like contained in the base layer 10 is large, the heat of fusion of the base layer 10 decreases. Accordingly, when the heat of fusion of the base layer is less than the lower limit, the amount of flame retardant, an inorganic filler, or the like contained in the base layer may be excessively large. As a result, a decrease in elongation, an increase in the ease of splitting, and the like may occur. On the other hand, when this heat of fusion exceeds the upper limit, flame retardancy, toughness, or elongation necessary for a heat-recoverable article may degrade.

The lower limit of the heat of fusion of the total resin component of the base layer 10 is preferably 80 J/g, and more preferably 90 J/g. The upper limit of the heat of fusion of the total resin component of the base layer 10 is preferably 135 J/g, and more preferably 120 J/g. In the case where the amount of a rubber component or an elastomer component in the base layer 10 is large, this heat of fusion becomes less than the lower limit. Therefore, the heat-recoverable article 1 starts to thermally shrink at a low temperature. Thus, when the heat of fusion is less than the lower limit, the heat-recoverable article 1 gradually thermally shrinks from a low temperature during heating. Consequently, the heat-recoverable article 1 after thermal shrinkage may have a non-homogeneous appearance. In addition, the heat-recoverable article may easily split at a high temperature.

In the case where the amount of a crystalline polyolefin-based resin in the base layer 10 is large and the amount of an amorphous polyolefin-based resin such as a rubber component or an elastomer component in the base layer 10 is small, the heat of fusion of the total resin component of the base layer 10 exceeds the upper limit. Splitting of the heat-recoverable article 1 occurs at an interface between the crystalline polyolefin-based resin and the amorphous polyolefin-based resin. Therefore, the larger the amount of a crystalline polyolefin-based resin and the smaller the amount of an amorphous polyolefin-based resin in the base layer 10, the more easily splitting occurs. Accordingly, when the heat of fusion of the total resin component of the base layer exceeds the upper limit, the heat-recoverable article 1 may easily split. When this heat of fusion exceeds the upper limit, the temperature at which the heat-recoverable article thermally shrinks increases. Consequently, an article covered with the heat-recoverable article may be adversely affected.

Regarding the polyolefin-based resins, the lower limit of the melting-point peak temperature of at least one of the polyolefin-based resins is preferably 112° C. or more, and more preferably 115° C. or more. In this case, the upper limit of the melting-point peak temperature of at least another one of the polyolefin-based resins is preferably less than 112° C., and more preferably less than 110° C. Alternatively, preferably, the another one of the polyolefin-based resins does not have a melting-point peak temperature. By controlling features of the polyolefin-based resins in this manner, the melting-point peak temperature of the base layer 10 and the heat of fusion of the total resin component of the base layer can be adjusted in the above ranges easily and reliably.

The another one of the polyolefin-based resins is preferably an ethylene-propylene copolymer elastomer, an ethylene-propylene rubber, or a polyethylene-based elastomer obtained by copolymerizing ethylene with at least any of butene, hexene, and octene. In this case, the melting-point peak temperature of the base layer 10 and the heat of fusion of the total resin component of the base layer can be adjusted in the above ranges more easily and more reliably.

(Flame Retardant)

Examples of the flame retardant include chlorine-based flame retardants such as chlorinated paraffin, chlorinated polyethylene, chlorinated polyphenyl, and perchloropentacyclodecane;

bromine-based flame retardants such as 1,2-bis(2,3,4,5,6-pentabromophenyl)ethane, ethylenebispentabromobenzene, ethylenebispentabromodiphenyl, tetrabromoethane, tetrabromobisphenol A, hexabromobenzene, decabromobiphenyl ether, tetrabromophthalic anhydride, polydibromophenylene oxide, hexabromocyclodecane, dibromoneopentyl glycol, and ammonium bromide;

phosphoric acid esters or phosphorus compounds such as triallyl phosphate, alkyl allyl phosphates, alkyl phosphates, dimethyl phosphonate, phosphinate, halogenated phosphinate esters, trimethyl phosphate, tributyl phosphate, trioctyl phosphate, tributoxyethyl phosphate, octyl diphenyl phosphate, tricresyl phosphate, cresyl phenyl phosphate, triphenyl phosphate, tris(chloroethyl) phosphate, tris(2-chloropropyl) phosphate, tris(2,3-dichloropropyl) phosphate, tris(2,3-dibromopropyl) phosphate, tris(bromochloropropyl) phosphate, bis(2,3-dibromopropyl) 2,3-dichloropropyl phosphate, bis(chloropropyl) monooctyl phosphate, polyphosphonate, polyphosphate, aromatic polyphosphate, and aluminum tris(diethylphosphinate);

polyols such as phosphonate polyols, phosphate polyols, and halogen element-containing polyols;

metal powders or inorganic compounds such as aluminum hydroxide, magnesium hydroxide, magnesium carbonate, antimony trioxide, antimony trichloride, zinc borate, antimony borate, boric acid, antimony molybdate, molybdenum oxide, phosphorus/nitrogen compounds, calcium/aluminum silicate, zirconium compounds, tin compounds, dawsonite, calcium aluminate hydrate, copper oxide, copper metal powders, calcium carbonate, and barium metaborate;

nitrogen compounds such as melamine cyanurate, triazine, isocyanurates, urea, and guanidine; and other compounds such as silicone-based polymers, ferrocene, fumaric acid, and maleic acid. Among these, halogen-based flame retardants such as bromine-based flame retardants and chlorine-based flame retardants are preferable. The bromine-based flame retardants and the chlorine-based flame retardants may be used alone or in combination of two or more compounds.

The lower limit of the content of the bromine-based flame retardant is preferably 1 part by mass, and more preferably 5 parts by mass relative to 100 parts by mass of the polyolefin-based resins. The upper limit of the content of the bromine-based flame retardant is preferably 50 parts by mass, and more preferably 40 parts by mass relative to 100 parts by mass of the polyolefin-based resins. The lower limit of the total content of the flame retardants is preferably 1 part by mass, and more preferably 5 parts by mass relative to 100 parts by mass of the polyolefin-based resins. The upper limit of the total content of the flame retardants is preferably 100 parts by mass, and more preferably 80 parts by mass relative to 100 parts by mass of the polyolefin-based resins. When the content of the bromine-based flame retardant or the total content of the flame retardants is less than the lower limit, the effect of providing flame retardancy may not be obtained. When the content of the bromine-based flame retardant or the total content of the flame retardants exceeds the upper limit, toughness or elongation necessary for the heat-recoverable article may degrade.

<Antioxidant>

The antioxidant is preferably a phenol-based antioxidant or an amine-based antioxidant. By using such an antioxidant, resistance to damage by copper can be improved. As the antioxidant, beside the above antioxidants, sulfur-based antioxidants, phosphorous acid ester-based antioxidants, and the like may be used alone or in combination.

The lower limit of the content of the antioxidant in the base layer 10 is preferably 1 part by mass, and more preferably 1.5 parts by mass relative to 100 parts by mass of the polyolefin-based resins. The upper limit of the content of the antioxidant is preferably 5 parts by mass, and more preferably 3 parts by mass relative to 100 parts by mass of the polyolefin-based resins. When the content of the antioxidant is less than the lower limit, the base layer 10 is easily oxidized, and the heat-recoverable article 1 may degrade. When the content of the antioxidant exceeds the upper limit, the antioxidant migrates to the surface of the base layer 10. Consequently, so-called blooming, in which an antioxidant is crystallized on a surface, or so-called bleed-out, in which an antioxidant bleeds out to a surface in the form of liquid, occurs, which may result in appearance defects.

(Phenol-Based Antioxidant)

Examples of the phenol-based antioxidant include pentaerythritol tetrakis[3-3,5-di-tert-butyl-4-hydroxyphenyl) propionate], tetrakis-[methylene-3-(3'5'-di-tert-butyl-4'-hydroxyphenyl)propionate]methane, triethylene glycol-bis[3-(3-tert-butyl-5-methyl-4-hydroxyphenyl) propionate], and 6-(4-hydroxy-3,5-di-tert-butyl.anilino)-2,4-bis.octyl-thio-1,3,5-triazine.

(Amine-Based Antioxidant)

Examples of the amine-based antioxidant include 4,4'-(α, α-dimethylbenzyl)diphenylamine, polymerized products of 2,2,4-trimethyl-1,2-dihydroquinoline, 6-ethoxy-2,2,4-trimethyl-1,2-dihydroquinoline, N-(1,3-dimethylbutyl)-N'-phenyl-1,4-phenylenediamine, and N-isopropyl-N'-phenyl-1,4-phenylenediamine.

(Copper Inhibitor)

Examples of the copper inhibitor include 3-(N-salicyloyl)amino-1,2,4-triazole, decamethylenedicarboxylic acid disalicyloylhydrazide, and 2,3-bis[3-(3,5-di-tert-butyl-4-hydroxyphenyl)propionyl]propionohydrazide. It is expected that damage by copper is prevented by incorporating the copper inhibitor in the base layer 10.

Regarding the range of the content of the copper inhibitor, for example, in the case where the copper inhibitor is 3-(N-salicyloyl)amino-1,2,4-triazole, the lower limit is preferably 0.5 parts by mass, and more preferably 1 part by mass relative to 100 parts by mass of the polyolefin-based resins. The upper limit is preferably 10 parts by mass, and more preferably 5 parts by mass relative to 100 parts by mass of the polyolefin-based resins. When the content of the copper inhibitor is less than the lower limit, the effect of the copper inhibitor may not be obtained. When the content of the copper inhibitor exceeds the upper limit, an improvement in the effect of preventing damage by copper is not obtained.

<Method for Producing Heat-Recoverable Article>

The heat-recoverable article 1 can be produced by, for example, the steps described below.

(1) A step of preparing a base layer resin composition for forming a base layer 10
(2) A step of forming an extrusion-molded product by extruding the base layer resin composition using a melt-extruder
(3) A step of expanding a diameter of the extrusion-molded product to obtain a heat-recoverable article (1) Step of Preparing Composition A base layer resin composition can be prepared by mixing a resin component, a flame retardant, and, as required, an additive using a melt-mixer. A known melt-mixer, for example, an open roll mill, a Banbury mixer, a pressure kneader, a single-screw mixer, or a multi-screw mixer may be used.

(2) Step of Forming Extrusion-Molded Product

An extrusion-molded product is formed by extruding the base layer resin composition using a known melt-extruder. By cross-linking the material of the base layer, heat resistance of the extrusion-molded product may be improved. Examples of the cross-linking method include cross-linking by irradiation with ionizing radiation, chemical cross-linking, and thermal cross-linking.

The dimensions of the extrusion-molded product can be designed in accordance with the use etc. Regarding an example of the dimensions of the extrusion-molded product corresponding to the base layer 10, the inner diameter and the wall thickness are 1.0 to 30 mm and 0.1 to 10 mm, respectively.

(3) Step of Expanding Diameter of Extrusion-Molded Product

Expansion of a diameter of the extrusion-molded product is performed as follows. The extrusion-molded product is inflated so as to have a predetermined inner diameter by, for example, introducing compressed air to the inside of the extrusion-molded product in a state where the extrusion-molded product is heated at a temperature equal to or higher than a melting point thereof. Subsequently, cooling is conducted to fix the shape. Such an expansion of the diameter of the extrusion-molded product is performed such that, for example, the inner diameter of the extrusion-molded product increases by about 2 to 4 times. The resulting product obtained by expanding the diameter of the extrusion-molded product and fixing the shape is the heat-recoverable article.

<Advantages>

According to the heat-recoverable article 1, the base layer 10 has a single melting-point peak temperature, the melting-point peak temperature is in the above range, and the heat of fusion of the base layer 10 is in the above range. Therefore, the heat-recoverable article 1 thermally shrinks in a suitable temperature range and does not easily split.

If the base layer 10 thermally shrinks stepwise, uniform thermal shrinkage does not easily occur. Therefore, stress concentration easily occurs in the heat-recoverable article, and the heat-recoverable article easily splits. However, the heat-recoverable article 1 described above thermally shrinks in one step. Accordingly, the thermal shrinkage occurs uniformly, and the heat-recoverable article 1 does not easily split. Furthermore, since the thermal shrinkage occurs in one step, the heat-recoverable article 1 after thermal shrinkage has a homogeneous appearance.

[Second Embodiment]

Figure 4:
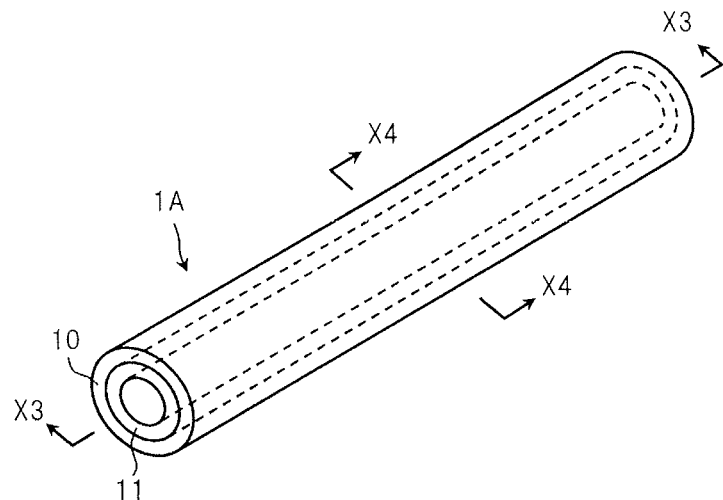
FIG. 4 is a schematic perspective view showing a heat-recoverable article according to a second embodiment of the present invention.
Figure 5:
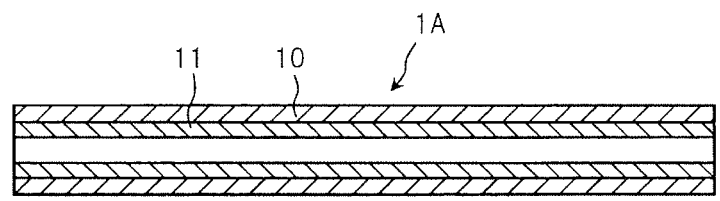
FIG. 5 is a schematic cross-sectional view taken along line X3-X3 in FIG. 4.
Figure 6:
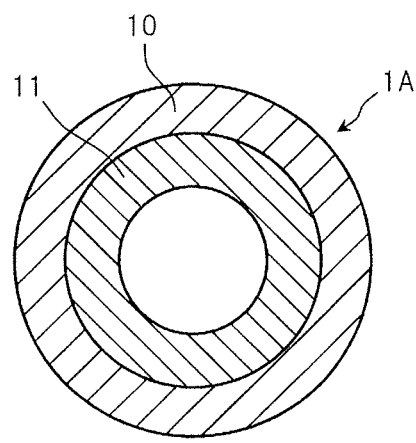
FIG. 6 is a schematic cross-sectional view taken along line X4-X4 in FIG. 4.

FIGS. 4 to 6 show a heat-recoverable article 1A of a second embodiment. In the heat-recoverable article 1A, components the same as those of the heat-recoverable article 1 of the first embodiment are assigned the same reference numerals, and a description of the components is omitted. The heat-recoverable article 1A of the second embodiment is a multilayer heat-recoverable article including an adhesive layer 11 formed on an inner circumferential surface of a base layer 10.

<Adhesive Layer>

The adhesive layer 11 preferably contains an ethylene-vinyl acetate copolymer or a polyamide. The adhesive layer 11 is a layer for enhancing adhesiveness between the base layer 10 and a cover portion to be covered with the heat-recoverable article 1A and improving a waterproof property, etc. An inorganic filler is preferably added to the adhesive layer 11 for the purpose of adjusting the viscosity after the adhesive layer 11 is formed into the heat-recoverable article 1A. Furthermore, other additives may be added to the adhesive layer 11, as required. Examples of the additives include an antioxidant, a copper inhibitor, a deterioration inhibitor, a viscosity improver, a flame retardant, a lubricant, a colorant, a heat stabilizer, an ultraviolet absorber, and a tackifier.

(Ethylene-Vinyl Acetate Copolymer)

The lower limit of the content of vinyl acetate of the ethylene-vinyl acetate copolymer is preferably 12% by mass, more preferably 15% by mass, and still more preferably 19% by mass. The upper limit of the content of vinyl acetate is preferably 46% by mass, more preferably 35% by mass, and still more preferably 30% by mass. When the content of vinyl acetate is less than the lower limit, sufficient flexibility may not be obtained. When the content of vinyl acetate exceeds the upper limit, during extrusion molding of the adhesive layer 11, an adhesive layer composition used for forming the adhesive layer 11 adheres to a die, a metal mold, etc. and handling may become difficult.

The lower limit of the MFR of the ethylene-vinyl acetate copolymer is preferably 50 g/10 min, and more preferably 100 g/10 min. When the MFR is less than the lower limit, a high pressure is necessary for forming the adhesive layer 11 by extrusion molding. The upper limit of the MFR of the ethylene-vinyl acetate copolymer is preferably 600 g/10 min, and more preferably 500 g/10 min. When the MFR exceeds the upper limit, the resin excessively flows and it becomes difficult to make the shape of the adhesive layer 11 uniform.

(Inorganic Filler)

Examples of the inorganic filler include organically treated layered silicates, organically treated swelling mica, calcium carbonate, and carbon. By incorporating an inorganic filler, the viscosity of the adhesive layer 11 can be easily adjusted and the thickness of the adhesive layer 11 can be made uniform.

Regarding the range of the content of the inorganic filler, for example, in the case where the inorganic filler is an organically treated layered silicate, the lower limit is preferably 0.5 parts by mass, and more preferably 2 parts by mass relative to 100 parts by mass of an ethylene-vinyl acetate copolymer or a polyamide. The upper limit is preferably 40 parts by mass, and more preferably 30 parts by mass relative to 100 parts by mass of an ethylene-vinyl acetate copolymer or a polyamide. When the content of the inorganic filler is less than the lower limit, the effect of the inorganic filler may not be obtained. When the content of the inorganic filler exceeds the upper limit, flexibility of the adhesive layer 11 may decrease.

(Organically Treated Layered Silicate)

The organically treated layered silicate is a layered silicate (clay mineral, clay) such as montmorillonite, bentonite, or smectite that has been subjected to an organic treatment. An interlayer cation such as magnesium ion, sodium ion, or calcium ion is present between silicate planes that are stacked in layers, thus maintaining a layered crystal structure. This interlayer cation is exchanged for an organic cation by subjecting the layered silicate to the organic treatment. In this manner, an organic compound is chemically bonded to surfaces of the silicate planes and introduced (intercalated) between layers. As a result, the interlayer distance between the silicate planes increases, and dispersibility in thermoplastic resins improves. A natural layered silicate or a synthesized layered silicate may be used as the layered silicate.

<Antioxidant>

The same antioxidant as that in the base layer 10 may be used as the antioxidant in the adhesive layer 11.

The lower limit of the content of the antioxidant in the adhesive layer 11 is preferably 4 parts by mass, and more preferably 6 parts by mass relative to 100 parts by mass of an ethylene-vinyl acetate copolymer or a polyamide. The upper limit of the content of the antioxidant is preferably 14 parts by mass, and more preferably 9 parts by mass relative to 100 parts by mass of an ethylene-vinyl acetate copolymer or a polyamide. When the content of the antioxidant is less than the lower limit, the adhesive layer 11 and the base layer 10 are easily oxidized, and the heat-recoverable article 1A may degrade. When the content of the antioxidant exceeds the upper limit, an improvement in the effect of preventing the adhesive layer 11 and the base layer 10 from being oxidized is not obtained.

(Copper Inhibitor)

Examples of the copper inhibitor include the same compounds as those used as the copper inhibitor in the base layer 10. It is expected that damage by copper is prevented by incorporating the copper inhibitor in the adhesive layer 11.

(Deterioration Inhibitor)

The deterioration inhibitor is an agent for suppressing degradation of an adherend to which the heat-recoverable article 1A adheres. Typically, the deterioration inhibitor is an agent for suppressing generation of cracks of an insulating layer of an insulated electric wire due to a basic component contained in the insulating layer or the adhesive layer 11 of the heat-recoverable article 1A. This deterioration inhibitor can also function as a viscosity improver. The deterioration inhibitor is selected in accordance with the factor of degradation of an adherend. For example, in the case where degradation of an adherend due to a basic component is suppressed, a compound that suppresses the occurrence of a dehydrochlorination reaction due to a basic component or a component that can capture or neutralize hydrogen chloride, a chloride ion, and the like generated by a dehydrochlorination reaction can be used. Examples of the deterioration inhibitor include activated clay, hydrotalcite, and antioxidants (acid value: 10 mgKOH/g or more) containing phosphorus. By incorporating any of these deterioration inhibitors in the adhesive layer 11, degradation of an adherend due to a basic component in the adhesive layer 11 can be suppressed by, for example, adsorbing a nitrogen-containing compound, incorporating an anion, and capturing hydrogen chloride generated by a dehydrochlorination reaction.

<Method for Producing Heat-Recoverable Article>

The heat-recoverable article 1A can be produced by, for example, the steps described below.

(1) A step of preparing a base layer resin composition for forming a base layer 10 and an adhesive composition for forming an adhesive layer 11

(2) A step of forming a multilayer extrusion-molded product by extruding the base layer resin composition and the adhesive composition using a melt-extruder (3) A step of expanding a diameter of the multilayer extrusion-molded product to obtain a heat-recoverable article 1A (1) Step of Preparing Compositions A base layer resin composition can be prepared by mixing a resin component, a flame retardant, and, as required, an additive using a melt-mixer. A known melt-mixer, for example, an open roll mill, a Banbury mixer, a pressure kneader, a single-screw mixer, or a multi-screw mixer may be used.

An adhesive composition can be prepared by mixing a resin component, preferably, an ethylene-vinyl acetate copolymer or a polyamide and, as required, an additive using a melt-mixer. The same melt-mixer as that used in the preparation of the base layer resin composition can be used as the melt-mixer.

(2) Step of Forming Multilayer Extrusion-Molded Product

A multilayer extrusion-molded product is formed by simultaneously extruding the base layer resin composition and the adhesive composition using a known melt-extruder. As a result, the multilayer extrusion-molded product is formed as a molded product in which an inner layer corresponding to the adhesive layer 11 is formed on the inner circumferential surface of an outer layer corresponding to the base layer 10. By cross-linking the material of the outer layer, heat resistance of the multilayer extrusion-molded product may be improved. Examples of the cross-linking method include cross-linking by irradiation with ionizing radiation, chemical cross-linking, and thermal cross-linking.

The dimensions of the multilayer extrusion-molded product can be designed in accordance with the use etc. Regarding an example of the dimensions of a layer corresponding to the base layer 10 of the multilayer extrusion-molded product, the inner diameter and the wall thickness are 1.0 to 30 mm and 0.1 to 10 mm, respectively. Regarding an example of the dimensions of a layer corresponding to the adhesive layer 11 of the multilayer extrusion-molded product, the inner diameter and the wall thickness are 0.1 to 10 mm and 0.1 mm to 8.5 mm, respectively.

(3) Step of Expanding Diameter of Multilayer Extrusion-Molded Product

Expansion of the diameter of the multilayer extrusion-molded product is performed as follows. The multilayer extrusion-molded product is inflated so as to have a predetermined inner diameter by, for example, introducing compressed air to the inside of the multilayer extrusion-molded product in a state where the multilayer extrusion-molded product is heated at a temperature equal to or higher than a melting point thereof. Subsequently, cooling is conducted to fix the shape. Such an expansion of the diameter of the multilayer extrusion-molded product is performed such that, for example, the inner diameter of the multilayer extrusion-molded product is increased by about 2 to 4 times. The resulting product obtained by expanding the diameter of the multilayer extrusion-molded product and fixing the shape is the heat-recoverable article 1A.

<Advantages>

Since the heat-recoverable article 1A includes the adhesive layer 11, adhesiveness between the base layer 10 and a cover portion to be covered with the heat-recoverable article 1A is enhanced to improve an insulation property, a waterproof property, an anticorrosion property, etc.

[Wire Splice and Wire Harness]

The heat-recoverable article of the present invention can be used for, for example, protection, insulation, waterproofing, and corrosion prevention of wires such as a polyethylene (PE) electric wire or PE cable that includes an insulating layer composed of PE, the insulating layer covering a conductor, and a polyvinyl chloride (PVC) electric wire or PVC cable that includes an insulating layer composed of PVC. Specifically, the heat-recoverable article can be applied to a wire splice and a wire harness.

Figure 7:
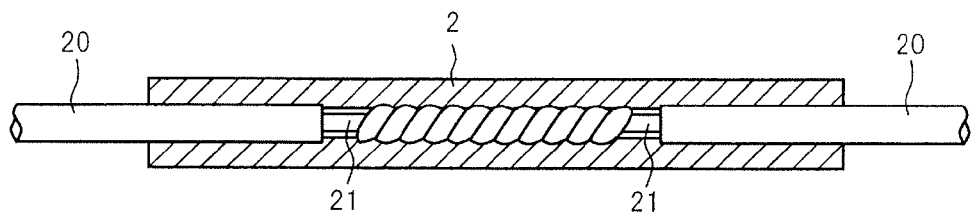
FIG. 7 is a schematic cross-sectional view showing a wire splice according to an embodiment of the present invention, the cross-sectional view corresponding to FIG. 2.
Figure 8:
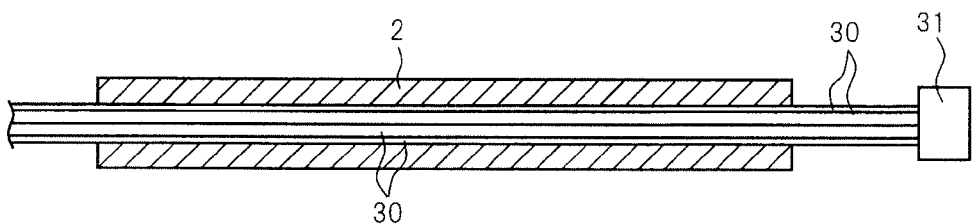
FIG. 8 is a schematic cross-sectional view showing a wire harness according to an embodiment of the present invention, the cross-sectional view corresponding to FIG. 2.
Figure 9:
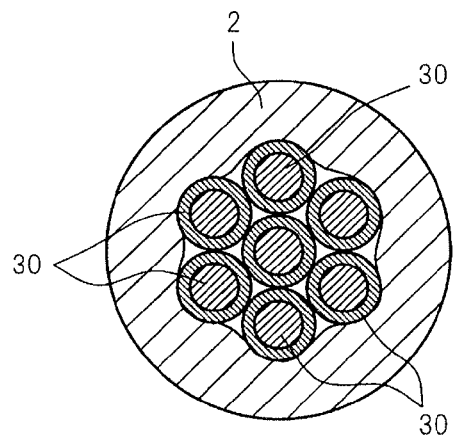
FIG. 9 is a schematic cross-sectional view of the wire harness shown in FIG. 8, the cross-sectional view corresponding to FIG. 3.

FIG. 7 shows an example in which the heat-recoverable article is applied to a wire splice. FIGS. 8 and 9 show an example in which the heat-recoverable article is applied to a wire harness.

The wire splice shown in FIG. 7 is obtained by stranding conductor wires 21 of a pair of wires 20 to connect to each other, and allowing a tube 2 to adhere to the connected portion, the tube 2 being formed by thermally shrinking the heat-recoverable article 1 in FIG. 1 or the heat-recoverable article 1A in FIG. 4. Each of the wires 20 is a cable or an insulated electric wire such as a PE electric wire or a PVC electric wire. For example, a wire that includes an insulating layer containing polyvinyl chloride as a main component and serving as an outermost layer is used as the wire 20. The content of polyvinyl chloride in the insulating layer is, for example, 50% by mass or more and 95% by mass or less. In this wire splice, the tube 2 can contribute to, for example, protection, insulation, waterproofing, and corrosion prevention of the connected portion.

The wire harness shown in FIGS. 8 and 9 is obtained by bundling a plurality of wires 30 with a tube 2 formed by thermally shrinking the heat-recoverable article 1 in FIG. 1 or the heat-recoverable article 1A in FIG. 4, and providing a multi-pin connector 31 at an end of the wires 30. The wires 30 are the same as the wires 20 of the wire splice shown in FIG. 7. In this wire harness, the tube 2 has not only a function of bundling the wires 30 but also a function of protecting each of the wires 30, etc.

It should be noted that the wire splice and the wire harness of the present invention may not be exactly discriminated from each other. There may be a case where a wire splice also functions as a wire harness.

[Other Embodiments]

Figure 10:
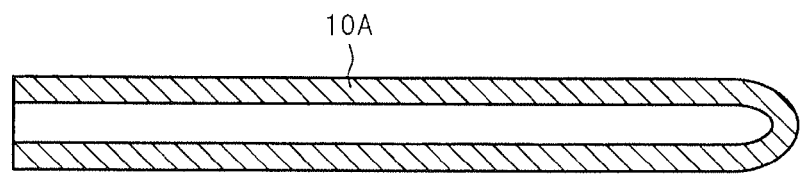
FIG. 10 is a schematic cross-sectional view showing a heat-recoverable article according to another embodiment of the present invention, the cross-sectional view corresponding to FIG. 2.

The heat-recoverable article of the present invention is not limited to the heat-recoverable articles shown in FIGS. 1 to 6, the heat-recoverable articles each including a base layer 10 formed so as to have a tubular shape. Alternatively, for example, the heat-recoverable article may include a base layer 10A formed so as to have a cap shape, as shown in FIG. 10. This heat-recoverable article is obtained by thermally shrinking an end of the heat-recoverable article shown in FIG. 1 to close the end. This heat-recoverable article can be suitably used for, for example, a terminal treatment of wiring.

The heat-recoverable article of the second embodiment may be formed by separately extruding a base layer and an adhesive layer. The heat-recoverable article in this case is used by arranging an adhesive layer inside a base layer that has been inflated after extrusion molding, allowing the resulting adhesive layer to adhere to an adherend, and thermally shrinking the base layer.

The wire splice of the present invention is not particularly limited as long as a heat-recoverable article adheres to a connected portion of wires. In the wire splice, a single wire may be connected to a plurality of wires, a plurality of wires may be connected to a plurality of wires, or ends of a plurality of wires may be integrally connected to each other, as in a terminal treatment of wiring. Alternatively, the wire splice of the present invention may have other forms.

The wire harness of the present invention may be constituted as a so-called flat harness in which a plurality of wires are bundled in a planar shape. Alternatively, the wire harness of the present invention may have other forms.

EXAMPLES

The present invention will now be described in more detail using Examples. However, the present invention is not limited to the Examples.

Examples and Comparative Examples

Heat-recoverable articles of Examples and Comparative Examples were produced by changing the composition of a base layer. Specifically, heat-recoverable articles were produced so as to have the compositions shown in Tables I and II by the step of forming an extrusion-molded product and the step of expanding a diameter. An outer diameter of a layer corresponding to the base layer of each of the extrusion-molded products was 4.6 mm, an inner diameter of the layer was 2.8 mm, and a wall thickness of the layer was 0.9 mm. Subsequently, the diameter of the extrusion-molded product was expanded in the diameter expansion step such that the outer diameter became 7.5 mm. Thus, heat-recoverable articles of Nos. 1 to 8 were produced as heat-recoverable articles of Examples, and heat-recoverable articles of Nos. 9 to 16 were produced as heat-recoverable articles of Comparative Examples.

TABLE I

|  |  |  | Test No. | | | | | | | |
|---|---|---|---|---|---|---|---|---|---|---|
|  |  |  | 1 | 2 | 3 | 4 | 5 | 6 | 7 | 8 |
| Base layer | Amount mixed (Parts by mass) | High-density polyethylene | 50 | 50 | 50 | — | 55 | 45 | 40 | 60 |
|  |  | Low-density polyethylene | — | — | 30 | — | — | — | — | — |
|  |  | Linear low-density polyethylene | 30 | 30 | — | 80 | — | 25 | 20 | — |
|  |  | Very low-density polyethylene elastomer 1 | 20 | — | — | — | — | — | — | — |
|  |  | Very low-density polyethylene elastomer 2 | — | — | — | — | — | — | — | — |
|  |  | Ethylene-propylene rubber | — | 20 | 20 | 20 | 45 | 30 | 40 | 40 |
|  |  | Ethylene-vinyl acetate copolymer | — | — | — | — | — | — | — | — |
|  |  | Bromine-based flame retardant | 40 | 40 | 40 | 40 | 30 | 40 | 40 | 40 |
|  |  | Antimony trioxide | 20 | 20 | 20 | 20 | 20 | 20 | 20 | 20 |
|  | Number of melting-point peak temperatures | | 1 | 1 | 1 | 1 | 1 | 1 | 1 | 1 |
|  | Melting-point peak temperature (° C.) | | 123 | 122 | 120 | 117 | 113 | 118 | 116 | 127 |
|  | Heat of fusion of base layer (J/g) | | 84.1 | 76.8 | 74.5 | 72.7 | 60.2 | 67.4 | 60.4 | 83.8 |
|  | Heat of fusion of total resin component of base layer (J/g) | | 134.6 | 122.9 | 119.2 | 116.3 | 90.3 | 107.8 | 96.6 | 134 |
| Test results | Low-temperature shrinkability | | A | A | A | A | A | A | A | A |
|  | Shape retention property | | A | A | A | A | A | A | A | A |
|  | Flame retardancy | | A | A | A | A | A | A | A | A |
|  | Tensile elongation | | A | A | A | A | A | A | A | A |
|  | Difficulty of splitting | During shrinkage | A | A | A | A | A | A | A | A |
|  |  | During heat cycle | A | A | A | A | A | A | A | A |

TABLE II

|  |  |  | Test No. | | | | | | | |
|---|---|---|---|---|---|---|---|---|---|---|
|  |  |  | 9 | 10 | 11 | 12 | 13 | 14 | 15 | 16 |
| Base layer | Amount mixed (Parts by mass) | High-density polyethylene | 100 | 50 | 50 | 50 | — | 50 | 50 | — |
|  |  | Low-density polyethylene | — | — | — | — | — | — | — | — |
|  |  | Linear low-density polyethylene | — | — | — | — | 100 | 50 | 30 | — |
|  |  | Very low-density polyethylene elastomer 1 | — | — | — | — | — | — | — | — |
|  |  | Very low-density polyethylene elastomer 2 | — | — | — | — | — | — | — | 100 |

TABLE II-continued

|  |  | Test No. | | | | | | | |
|---|---|---|---|---|---|---|---|---|---|
|  |  | 9 | 10 | 11 | 12 | 13 | 14 | 15 | 16 |
|  | Ethylene-propylene rubber | — | 50 | 50 | — | — | — | 20 | — |
|  | Ethylene-vinyl acetate copolymer | — | — | — | 50 | — | — | — | — |
|  | Bromine-based flame retardant | 40 | 40 | 10 | 40 | 40 | 40 | 100 | 40 |
|  | Antimony trioxide | 20 | 20 | — | 20 | 20 | 20 | 50 | 20 |
|  | Number of melting-point peak temperatures | 1 | 1 | 1 | 2 | 1 | 1 | 1 | 1 |
|  | Melting-point peak temperature (° C.) | 130 | 108 | 107 | 85 129 | 117 | 121 | 123 | 104 |
|  | Heat of fusion of base layer (J/g) | 107.3 | 49.5 | 72.3 | 71.3 | 92.1 | 95.1 | 49.2 | 45.8 |
|  | Heat of fusion of total resin component of base layer (J/g) | 171.7 | 79.2 | 79.5 | 114.1 | 147.4 | 152.2 | 123.1 | 73.3 |
| Test results | Low-temperature shrinkability | B | A | A | B | A | A | A | A |
|  | Shape retention property | A | B | B | B | A | A | A | B |
|  | Flame retardancy | A | A | B | A | A | A | A | A |
|  | Tensile elongation | A | A | A | A | A | A | B | A |
| Difficulty of splitting | During shrinkage | B | A | A | B | B | B | B | A |
|  | During heat cycle | — | A | A | — | — | — | — | B |

Details of the components in Tables I and II are as follows. The MFR shown below was measured in accordance with JIS-K7210:1997 at a temperature of 190° C. and at a load of 21.6 kg by using an extrusion plastometer specified in JIS-K6760: 1997.

High-density polyethylene: MFR 0.8 g/10 min, mp 130° C., density 0.95 g/mL
Low-density polyethylene: MFR 1.5 g/10 min, mp 108° C., density 0.92 g/mL
Linear low-density polyethylene: MFR 0.8 g/10 min, mp 120° C., density 0.92 g/mL
Very low-density polyethylene elastomer 1: MFR 0.5 g/10 min, mp 55° C., density 0.87 g/mL
Very low-density polyethylene elastomer 2: MFR 1.0 g/10 min, mp 104° C., density 0.91 g/mL
Ethylene-propylene rubber: Mooney viscosity ($ML_{1+4}$, 125° C.) 25
Ethylene-vinyl acetate copolymer: MFR 2.5 g/10 min, vinyl acetate content 19% by weight, mp 84° C., density 0.94 g/mL
Bromine-based flame retardant: 1,2-bis(2,3,4,5,6-pentabromophenyl)ethane
Antimony trioxide: average particle diameter 1 μm
In the above list, "mp" denotes the melting-point peak temperature.

<Melting-Point Peak Temperature, Heat of Fusion of Base Layer, and Heat of Fusion of Total Resin Component of Base Layer>

Tables I and II show a melting-point peak temperature, a heat of fusion of the base layer, and a heat of fusion of the total resin component of the base layer in each of the heat-recoverable articles of Nos. 1 to 16. Methods for measuring these values are as follows.

(Melting-Point Peak Temperature)

A heat-recoverable article was heated at 180° C. for two minutes. A temperature of the heat-recoverable article was then increased from room temperature to 200° C. at 10° C./min with a differential scanning calorimeter ("DSC 8500" manufactured by PerkinElmer Co., Ltd.). A temperature at which an amount of heat absorption in the base layer per time becomes maximum during this temperature increase was defined as the melting-point peak temperature.

(Heat of Fusion of Base Layer)

A value (J/g) determined by dividing an amount (J) of heat absorption of the heat-recoverable article by a mass (g) of the base layer, the amount (J) of heat being absorbed during the measurement of the melting-point peak temperature, was defined as the heat of fusion of the base layer.

(Heat of Fusion of Total Resin Component of Base Layer)

A value (J/g) determined by dividing an amount (J) of heat absorption of the heat-recoverable article by a total mass (g) of the polyolefin-based resins in the base layer, the amount (J) of heat being absorbed during the measurement of the melting-point peak temperature, was defined as the heat of fusion of the total resin component of the base layer.

<Evaluation of Heat-Recoverable Article>

For the heat-recoverable articles of Nos. 1 to 16, low-temperature shrinkability, a shape-retention property, flame retardancy, tensile elongation, and difficulty of splitting were evaluated. Tables I and II show the evaluation results. Testing methods of the evaluation items are as follows.

(Low-Temperature Shrinkability)

A shrinkage restoration ratio when heating was conducted at 140° C. for five minutes was determined. When the shrinkage restoration ratio was 85% or more, the heat-recoverable article was evaluated as acceptable, and the result is denoted by "A". When the shrinkage restoration ratio was less than 85%, the heat-recoverable article was evaluated as unacceptable, and the result is denoted by "B". The shrinkage restoration ratio is a value determined by a formula below.

Shrinkage restoration ratio (%)=(outer diameter after inflation in diameter expansion step−outer diameter after thermal shrinkage)/(outer diameter after inflation in diameter expansion step−outer diameter after extrusion molding)×100

(Shape-Retention Property)

A shrinkage restoration ratio when heating was conducted at 100° C. for five minutes was determined. When the shrinkage restoration ratio was less than 20%, the heat-recoverable article was evaluated as acceptable, and the result is denoted by "A". When the shrinkage restoration ratio was 20% or more, the heat-recoverable article was evaluated as unacceptable, and the result is denoted by "B".

(Flame Retardancy)

A copper rod having a diameter ϕ of 2.8 mm was covered with a heat-recoverable article and heated at 180° C. for two minutes to thermally shrink the heat-recoverable article. The VW-1 vertical-specimen flame test described in the UL standards 224 was conducted using the heat-recoverable article after the thermal shrinkage. In the vertical-specimen flame test, a flame was applied to a heat-recoverable article, which was vertically arranged, for 15 seconds and then removed. This procedure was repeated five times. When the flame expired within 60 seconds after the application of the flame, the heat-recoverable article was evaluated as acceptable, and the result is denoted by "A". When the flame did not expire within 60 seconds, the heat-recoverable article was evaluated as unacceptable, and the result is denoted by "B".

(Tensile Elongation)

A sample was completely shrunk by heating at 180° C. for two minutes. A tensile test was conducted using the resulting sample with a tensile tester at a tensile speed of 200 mm/min. When the elongation was 100% or more, the sample was evaluated as acceptable, and the result is denoted by "A". When the elongation was less than 100%, the sample was evaluated as unacceptable, and the result is denoted by "B".

(Difficulty of Splitting <<During Shrinkage>>)

A cut of 1 mm was made with a cutter knife in a heat-recoverable article in a longitudinal direction. A 25-mm square copper rectangular column was covered with the heat-recoverable article. The heat-recoverable article was thermally shrunk by heating at 180° C. for two minutes. The length of splitting in the longitudinal direction propagated due to this thermal shrinkage was measured. When the length was less than 5 mm, the heat-recoverable article was evaluated as acceptable, and the result is denoted by "A". When the length was 5 mm or more, the heat-recoverable article was evaluated as unacceptable, and the result is denoted by "B".

(Difficulty of Splitting <<During Heat Cycle>>)

A 25-mm square copper rectangular column was covered with a heat-recoverable article. The heat-recoverable article was thermally shrunk by heating at 180° C. for two minutes. In this state, heat cycles of 40° C.×20 minutes and 125° C.×20 minutes were performed 50 cycles. In the case where splitting did not occur, the heat-recoverable article was evaluated as acceptable, and the result is denoted by "A". In the case where splitting occurred, the heat-recoverable article was evaluated as unacceptable, and the result is denoted by "B". The symbol "-" in this evaluation item in the tables shows that the difficulty of splitting during shrinkage was evaluated as unacceptable and thus this item was not evaluated.

(Results)

Regarding the heat-recoverable articles of Nos. 1 to 8, all of the results of the low-temperature shrinkability, the shape-retention property, the flame retardancy, the tensile elongation, and the difficulty of splitting were acceptable. In contrast, regarding the heat-recoverable articles of Nos. 9 to 16, any of the results of the low-temperature shrinkability, the shape-retention property, the flame retardancy, the tensile elongation, and the difficulty of splitting was unacceptable.

INDUSTRIAL APPLICABILITY

The heat-recoverable article of the present invention and the wire splice and the wire harness that use the heat-recoverable article thermally shrink in a suitable temperature range, and do not easily split. As a result, the heat-recoverable article, the wire splice, and the wire harness of the present invention can be respectively suitably used as a heat-recoverable article, a wire splice, and a wire harness for which a long lifetime is required.

REFERENCE SIGNS LIST 1, 1A heat-recoverable article 10, 10A base layer 11 adhesive layer 2 tube 20, 30 wire 21 conductor wire 31 multi-pin connector

The invention claimed is:

1. A cylindrical, heat-recoverable article comprising a base layer,
wherein the base layer contains a flame retardant and two or more polyolefin-based resins,
the base layer has a single melting-point peak temperature, the melting-point peak temperature is 112° C. or more and 128° C. or less, and a heat of fusion of the base layer is 60 J/g or more and 85 J/g or less.

2. The heat-recoverable article according to claim 1, wherein, of the polyolefin-based resins, at least one of the polyolefin-based resins has a melting-point peak temperature of 112° C. or more, and at least another one of the polyolefin-based resins has a melting-point peak temperature of less than 112° C. or does not have a melting-point peak temperature.

3. The heat-recoverable article according to claim 2, wherein the another one of the polyolefin-based resins is an ethylene-propylene copolymer elastomer, an ethylene-propylene rubber, or a polyethylene-based elastomer obtained by copolymerizing ethylene with at least any of butene, hexene, and octene.

4. The heat-recoverable article according to claim 1, wherein a heat of fusion of a total resin component of the base layer is 80 J/g or more and 135 J/g or less.

5. The heat-recoverable article according to claim 1, comprising an adhesive layer formed on an inner circumferential surface of the base layer.

6. The heat-recoverable article according to claim 5, wherein the adhesive layer contains an ethylene-vinyl acetate copolymer or a polyamide.

7. A wire splice comprising: a plurality of wires each of which includes a conductor and an insulating layer formed on an outside of the conductor, and a tube adhering to a portion where the conductors of the wires are connected to each other, the tube being formed by thermally shrinking the heat-recoverable article according to claim 1.

8. A wire harness comprising: a plurality of wires each of which includes a conductor and an insulating layer formed on an outside of the conductor, and a tube adhering to the wires and formed by thermally shrinking the heat-recoverable article according to claim 1.

* * * * *